April 3, 1934.  A. J. MEYER  1,953,185
ENGINE
Filed March 16, 1931  2 Sheets-Sheet 1
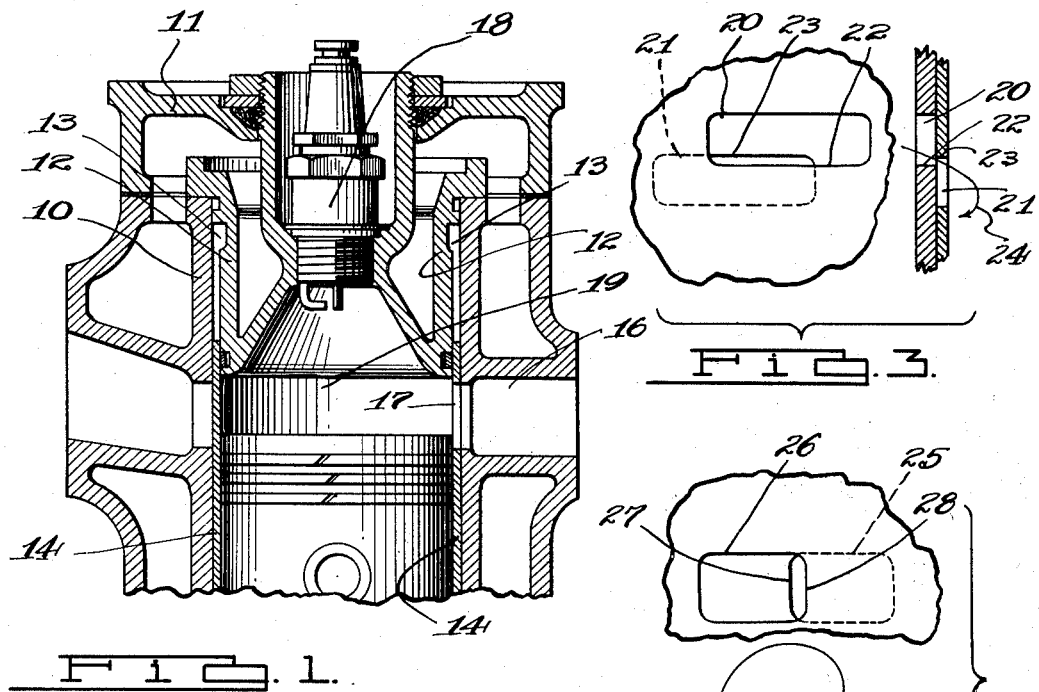
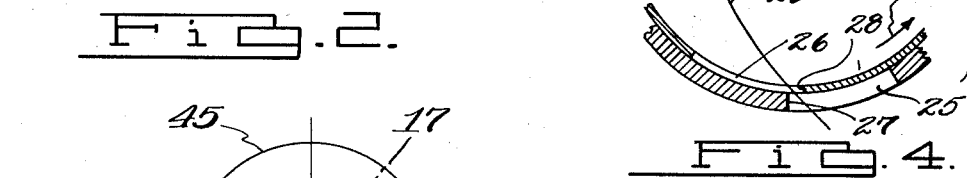
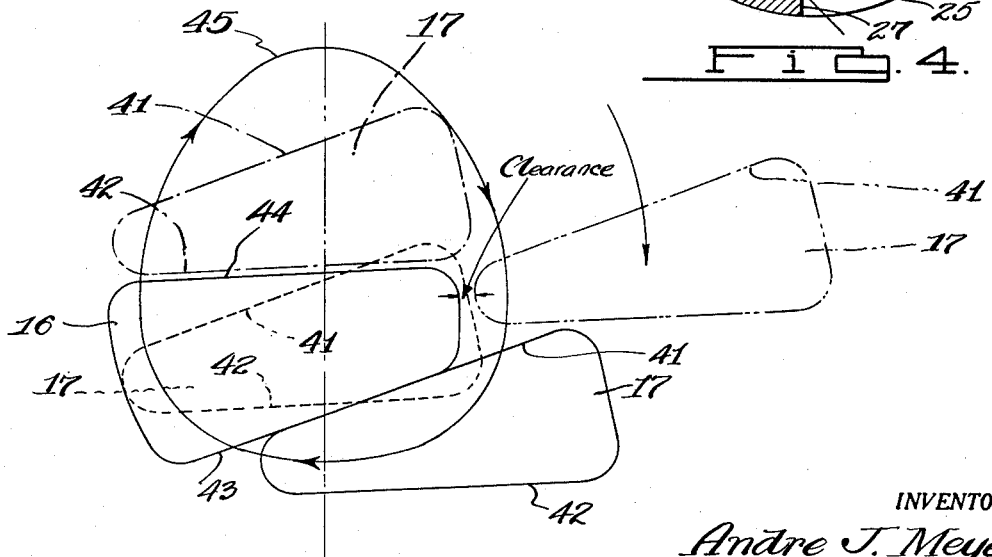
INVENTOR.
Andre J. Meyer
BY
ATTORNEY.

April 3, 1934.  A. J. MEYER  1,953,185
ENGINE
Filed March 16, 1931   2 Sheets-Sheet 2
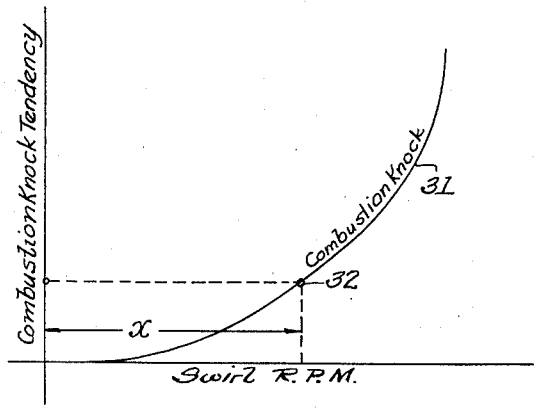
Fig. 5.
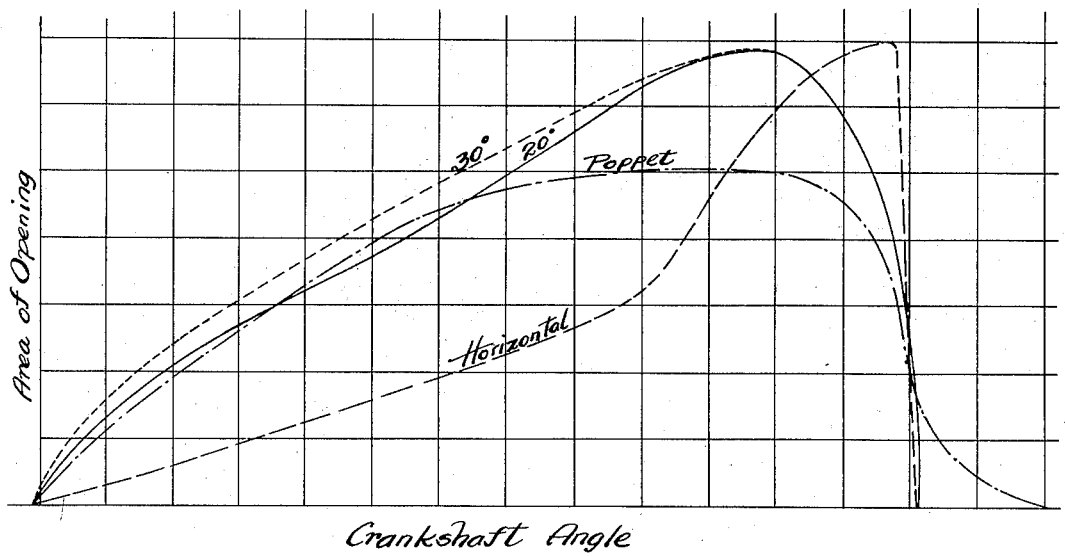
Fig. 6.
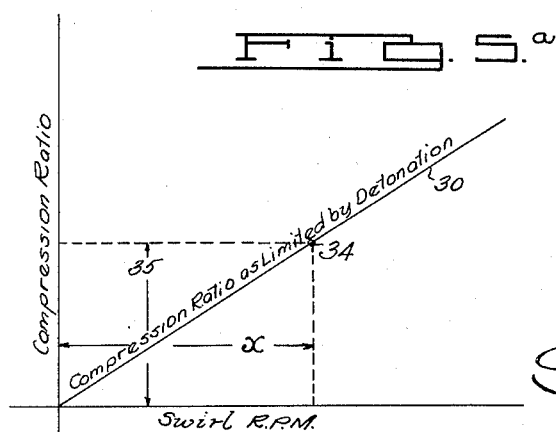
Fig. 5.ᵃ
INVENTOR.
Andre J. Meyer
BY
ATTORNEY.

Patented Apr. 3, 1934

1,953,185

UNITED STATES PATENT OFFICE 1,953,185

ENGINE

Andre J. Meyer, Detroit, Mich., assignor to Continental Motors Corporation, Detroit, Mich., a corporation of Virginia Application March 16, 1931, Serial No. 522,838

26 Claims. (Cl. 123—81)

My invention relates to engines and more particularly to sleeve valve means adapted for employment with an engine of the internal combustion type.

Experience has shown that the standard single sleeve valve means having the conventional type of intake ports arranged for operative association with cylinder intake ports causes the fuel mixture to swirl within the combustion chamber. Swirling of the fuel mixture reduces detonation which permits the construction of an engine with a relatively higher compression ratio. However, swirling of the fuel mixture produces a stratification of the fuel mixture charge, producing a leaner mixture at the center of the swirl at the center of the combustion chamber than at the outer peripheral portion of the combustion chamber where the heavier fuel particles are thrown by centrifugal force. Thus, the leaner fuel mixture at the center will burn more rapidly than the heavier richer fuel mixture around the outside of the combustion chamber. As the swirling of the fuel mixture is increased the fuel mixture at the center of the combustion chamber becomes more lean with the result that the flame travel becomes more rapid, thereby causing an objectionable combustion knock. This combustion knock is not audible with a small amount of swirling, and thus I find it advisable to construct the engine with some swirl in order to obtain the maximum of benefits in regard to detonation but to limit the swirl to an amount which will not cause an objectionable combustion knock.

I have determined by experiment, the various swirl speeds which occur in the combustion chamber and at various points therein with the use of a light, sensitive vane rotor exposed to the swirl and having a rotatable shaft projecting outside the engine combustion chamber, the shaft providing an accurate means for counting the R. P. M. of the vane and swirling fuel mixture. While the most favorable R. P. M. of swirl will vary at different engine speeds and with different size engines, I have found that swirl for ordinary mixture ranging in the neighborhood of 3,000 to 5,000 R. P. M. is very beneficial in ordinary sizes of single sleeve valve engines of the size used in the automotive industry.

I have discovered that the swirling of the combustible fuel mixture may be controlled by providing sleeve intake ports of the proper construction and this invention in its more specific aspect is directed to the intake port construction.

It is an object of my invention to provide improved means and methods for utilizing swirl of the fuel mixture to the best advantages. It is a further object of my invention to provide an improved method and means to construct and provide an engine having the highest permissible compression ratio within limits of combustion knock and detonation and thereby obtain the maximum of power, fuel economy, and other desirable characteristics of general engine performance.

Further objects and advantages of my invention will be apparent as the details of my invention are hereinafter set forth.

For a more detailed understanding of my invention, reference may be had to the accompanying drawings which illustrate one form which my invention may assume, and in which:

Figure 1 is a vertical transverse sectional view through a sleeve valve engine constructed in accordance with my invention, Figure 2 is a diagrammatic view of the cooperating cylinder and sleeve intake ports illustrating the relative movement between said ports, Figure 3 is a composite diagrammatic elevational and sectional view of a portion of a sleeve valve and cylinder having intake ports provided with opening edges that extend substantially horizontal, Figure 4 is another composite diagrammatic elevational and sectional view showing a portion of a sleeve valve means provided with intake ports having opening edges which extend vertically or parallel to the sleeve and cylinder axes, Fig. 5 is a curve of combustion knock tendency against swirl in R. P. M. diagrammatically represented for illustrative purposes, Fig. 5ª is a curve of compression ratio against swirl in R. P. M. diagrammatically represented for illustrative purposes, and Figure 6 is a diagrammatic representation of curves representing the area of the port opening plotted against the crankshaft angle, these curves representing intake port openings for various types of valve means.

I have illustrated my invention with an internal combustion engine of the sleeve valve type, this engine comprising in general a cylinder 10 and a cylinder head 11 which is adapted to be secured to said cylinder in the usual manner, said cylinder head having a depending portion 12 depending within the cylinder and spaced from the walls thereof to provide a sleeve pocket 13. Sleeve valve means 14 operate within the cylinder 10 and the upper end of said sleeve valve means is adapted to project within the sleeve pocket 13. A piston 15 operates within the sleeve valve means and may be connected to the engine crankshaft (not shown) in the usual manner. The cylinder 10 is provided with one or more intake ports 16 and the sleeve valve means is provided with intake ports 17 adapted to cooperate with the cylinder port 16. This invention is especially adapted for use with a single sleeve valve means which is given a combined reciprocating and oscillating movement relative to the sleeve and cylinder axes, whereby any point on said sleeve traverses a closed path. The cylinder head carries a spark plug 18 preferably disposed centrally of the cylinder head for igniting the combustible fuel mixture within the combustion chamber 19.

As stated above, the conventional port openings of a single sleeve valve means causes a swirling of the fuel mixture within the combustion chamber, and as explained above this is beneficial in some respect and detrimental in others. It would be possible to eliminate practically all swirling in the combustion chamber of a sleeve valve engine by providing cooperating cylinder and sleeve ports 20 and 21 respectively as illustrated in Figure 3 in which the opening edges 22 and 23 respectively lie substantially in planes extending perpendicular to the cylinder and sleeve axes. As illustrated in this figure it will be noted that the incoming fuel mixture is directed substantially as shown by the arrow 24, the fuel mixture being directed downwardly of the cylinder and being caused to swirl slightly in a vertical plane parallel to the cylinder and the sleeve axes.

In Figure 4 I have illustrated cooperating cylinder and sleeve ports 25 and 26 respectively in which the opening edges 27 and 28 extend substantially vertical or parallel to the cylinder and sleeve axes. This port construction as illustrated in Figure 4 imparts a maximum horizontal swirl to the incoming fuel mixture as shown by the arrow 29. I have discovered that by inclining the opening edges of cooperating cylinder and sleeve ports with respect to the horizontal plane through the engine that the swirl of the incoming fuel mixture may be varied, said swirl being adapted to be varied proportionally to the angle of inclination. Thus it was determined that this angle of inclination must be somewhere between the horizontal and vertical position as shown in Figures 3 and 4. It will be noted that when the opening edges of these cooperating ports are inclined the inclined edge may be resolved into horizontal and vertical components, and the vertical component is the only one which must be considered as acting to produce the horizontal swirl. By experiment I have found that the angle of inclination of the opening edges of said cooperating cylinder and sleeve ports must be less than 35° with respect to the horizontal plane and in order to obtain the maximum benefit from a limited amount of swirl I find that this angle should be more than approximately 10° with respect to said horizontal plane, and preferably I find that the best results may be obtained by inclining these closing edges at an angle of approximately 20° with respect to the said horizontal plane. These values in degrees are based on cooperating sleeve and cylinder ports having horizontal closing edges as illustrated, these closing edges having no vertical components producing or opposing swirl. If such closing edges have vertical components then the opening edges should vary as to their inclination to produce the net desired swirl.

Before discussing the illustrative curves in Figs. 5 and 5ª I will define the terms and expressions used herein. First of all I will distinguish between combustion knock and detonation. These terms both refer to well known phenomena occurring during the process of combustion of the gasoline fuel mixture within engine combustion chambers.

Detonation is characterized by a high pitched metallic sound and occurs during burning of approximately the last ten percent of the fuel mixture charge. It is not a theoretical phenomenon but is well known and has been photographed. It is a substantially instantaneous ignition of the last part of the charge in the combustion chamber, taking place at various points throughout the charge as distinguished from the progressive burning of the charge during earlier stages of the combustion process.

Combustion knock is characterized by an entirely different sound than that produced by detonation. It is evidenced by a low pitch thumping or rough sound and is primarily produced by sudden taking up of clearances of the parts between the usual engine piston and crankshaft. Combustion knock takes place during the early stages of combustion and is caused by a too rapid initial flame propagation. In addition to its being evidenced by the aforesaid sound, it is evidenced in the usual indicator cards showing a very rapid initial pressure rise, causing sudden taking up of clearances as stated above.

Combustion knock and detonation may occur together or separately during combustion and in either event they are easily distinguished.

The curves in Figs. 5 and 5ª are not entirely test curves but are included as being helpful in order to illustrate my invention. However, these curves do correctly portray the tendencies of detonation and combustion knock as determined by test.

Referring to Fig. 5, I have determined that as the swirl increases the combustion knock tendency increases, this condition being represented by the curve 31. At moderate swirl values below approximately 3000 R. P. M. combustion knock is not appreciable but tends to be evidenced rapidly with increasing swirl R. P. M. Thus as the swirl increases from a condition of no combustion knock, the engine first begins to run rough and finally knocks very distinctly at about 10,000 R. P. M. of swirl. The combustion knock tendency is practically unaffected by compression ratio.

Referring to Fig. 5ª I have determined by a study of the effect of swirl variation and detonation tendencies that as the swirl increases detonation is reduced or eliminated. Therefore, the compression ratio of the engine can be increased by increasing the swirl. It is desirable to provide as high a compression ratio as possible since this factor influences power output, fuel economy, and other engine characteristics. The limiting point in increasing compression ratio from the standpoint of detonation occurs when detonating tendencies become audible to an objectionable point. Therefore, when the compression ratio has been raised to the point where detonation is heard, the swirl is increased to suppress the detonation or else the compression ratio is reduced to the point where detonation knock disappears. In Fig. 5ª the permissible compression ratio increases with swirl increase as indicated by the straight line 30.

In determining the permissible engine compression ratio and the permissible swirl as limited by combustion knock and detonation, I increase the swirl just prior to the point where combustion knock tendencies become objectionable as illustrated by the point 32 on curve 31 of Fig. 5, the swirl R. P. M. being given by value X. Thus X represents the permissible swirl from the standpoint of combustion knock tendency. Now, this value X is marked off as indicated in Fig. 5a which determines point 34 on line 30 which in turn indicates a value represented at 35 for determining the permissible compression ratio.

By reason of my invention I have provided a method for determining the maximum compression ratio and maximum swirl permissible with respect to combustion knock and detonation knock tendencies of the engine.

The swirl imparted to the fuel mixture due to its tangential entry into the cylinder is increased by piston compression and increases with increased engine speeds but the swirl influence is obtained and controlled by the ports.

On determining the proper swirl which is desired to be produced in the combustion chamber the angle of inclination of the opening edges of the cooperating cylinder and sleeve ports may be determined, and as a result of these computations and experiments the angle of 20° was found to be substantially the most desirable, however, it must be understood that there will be some minor considerations which will affect the final solution which is determined primarily by experiment and which may vary the angle to some extent and it may be necessary to vary this angle for various types and sizes of engines. Experience has shown that the angle of inclination of the opening edges of said cooperating cylinder and sleeve ports will lie substantially within the maximum and minimum limits as stated above for most types of engines which are commercially produced.

The sleeve 14 employed in the engine shown in the illustrated embodiment of my invention is provided with an intake port 17 having an inclined opening edge 41 and a horizontal closing edge 42, this opening edge being inclined substantially at an angle of approximately 20° to the horizontal plane of the engine which extends substantially perpendicular to the cylinder and sleeve axes. The cylinder 10 as stated above is provided with an intake port 16, and this intake port is provided with an inclined opening edge 43 and the closing edge 44, said opening edge 43 being inclined substantially the same angle with respect to the horizontal plane of the engine as the opening edge of the sleeve port 17. Thus on operating the sleeve valve means the same is given a combined reciprocating and oscillating movement with respect to the cylinder and sleeve axes whereby any point on said sleeve is caused to travel in a closed path as indicated by the substantially elliptical curve 45 illustrated in Figure 2. On operating the valve the opening edges 41 and 43 of the sleeve and cylinder intake ports respectively are caused to meet and the port is cracked open along substantially the full length of the opening edges of said cylinder and sleeve at the same time. Thus the fuel mixture is tangentially admitted into the cylinder and combustion chamber and a predetermined swirl is imparted to this fuel mixture as has been determined by computation and experiments conducted as outlined in the foregoing paragraphs.

It will thus be observed that I have provided cooperating cylinder and sleeve intake ports which are constructed to control the swirling of the fuel mixture within the engine cylinder or combustion chamber.

Another advantage of controlling the swirling of the fuel mixture by the means as described above is that a positive control of said swirl may be had and it is possible to thereby employ an intake manifold which is constructed and designed for obtaining the most efficient fuel distribution to the respective cylinders.

It will be noted on observing the plotted curves in Figure 6 that cylinder and sleeve intake ports having opening edges inclined at an angle of approximately 20° with the horizontal plane of the engine extending perpendicular to the cylinder and sleeve valve axes, that a port area may be obtained which very closely approximates the port area obtained with a poppet valve engine. The relative larger port area obtained near the end of the intake stroke is beneficial in utilizing ramming. It will be noted that relatively slight variations in the angle of inclination of the openings either way from an angle of 20° do not materially effect the port area, and in consideration of all the variable factors lead to the adoption of an angle of approximately 20° as being the most desirable for all practical purposes.

In order to construct a sleeve valve with an intake port having an opening edge inclined at an angle of approximately 20° with the horizontal, I find it undesirable to open the intake ports as is done with conventional ports which open at the bottom dead center of the sleeve travel or not more than 5° past the bottom dead center of the sleeve travel. I have constructed my sleeve valve and so timed the same that the intake port opens at a relatively greater angle past bottom dead center of the sleeve travel. In fact, I have found by experiment that it is preferable to open said port at an angle more than 10° past bottom dead center of the sleeve travel since such a construction facilitates the port arrangement and construction of the 20° opening edge. In the illustrated embodiment of my invention I have arranged for said port to open when the sleeve is positioned at an angle of approximately 17½° past bottom dead center of the sleeve travel, thereby providing an opening edge positioned at the desired inclination as determined by the combustion knock tendency and the detonation characteristics of the engine.

Although I have chosen to illustrate my invention as applied to a single sleeve valve engine of the Burt-McCollum type, it will be understood that the principle of my invention may be incorporated in internal combustion engines of other types, such as those provided with valve means consisting of one or more sleeves or segments of sleeves, said valve means having a reciprocating motion, a rotary motion, an oscillating motion, or combined reciprocating or oscillating motion.

It will be apparent to those skilled in the art to which my invention pertains that various modifications and changes may be made therein without departing from the spirit of my invention or from the scope of the appended claims.

What I claim as my invention is:

1. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined edges each having a horizontal component greater than the vertical component whereby to provide a predetermined swirling of the fuel mixture in said cylinder.

2. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined edges each inclined at an angle less than 35 degrees to said horizontal plane perpendicular to the cylinder and sleeve axes whereby to provide swirling of the fuel mixture in said cylinder.

3. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined edges each inclined at an angle less than 35 degrees and more than 10 degrees to said horizontal plane perpendicular to the cylinder and sleeve axes whereby to provide swirling of the fuel mixture in said cylinder.

4. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined edges each having a horizontal component greater than the vertical component whereby to provide swirling of the fuel mixture in said cylinder, the angle of inclination of the opening edge of said sleeve intake port being substantially the same as the angle of inclination of the opening edge of said cylinder intake port.

5. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined edges each having a horizontal component greater than the vertical component whereby to provide swirling of the fuel mixture in said cylinder, said vertical component constructed to provide swirl less than that tending to produce an objectionable combustion knock during the operation of the engine.

6. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined edges each having a horizontal component greater than the vertical component whereby to provide swirling of the fuel mixture in said cylinder, the angle of inclination of the opening edge of said sleeve intake port being substantially the same as the angle of inclination of the opening edge of said cylinder intake port, said vertical component constructed to provide swirl less than that tending to produce an objectionable combustion knock during the operation of the engine.

7. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined opening edges of the cylinder and sleeve intake ports cooperating to produce a predetermined horizontal swirl to the fuel mixture in said cylinder less than that tending to produce an objectionable combustion knock during the operation of the engine.

8. An internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said cylinder and sleeve intake ports having opening edges inclined to a horizontal plane extending perpendicular to the sleeve and cylinder axes, said inclined opening edges of the cylinder and sleeve intake ports adapted for cooperative operation to provide an initial port opening extending substantially the entire length of the opening edge of said cylinder and sleeve intake ports and to produce horizontal swirl to the fuel mixture in said cylinder less than that tending to produce an objectionable combustion knock during the operation of the engine.

9. In an internal combustion engine including a cylinder having intake port means, a piston reciprocating within the cylinder, and sleeve valve means associated therewith, said sleeve valve means having intake port means cooperating with said cylinder intake port means and constructed to impart a directional movement to the fuel mixture determined by the combustion knock tendency and detonation characteristics of the engine.

10. In an internal combustion engine including a cylinder having intake port means, a piston reciprocating within the cylinder, and sleeve valve means associated therewith, said sleeve valve means having intake port means cooperating with said cylinder intake port means and constructed to impart swirl to the fuel mixture determined by the combustion knock tendency and detonation characteristics of the engine.

11. In an internal combustion engine including a cylinder having intake port means, a piston reciprocating within the cylinder, and sleeve valve means associated therewith, said sleeve valve means having intake port means cooperating with said cylinder intake port means and constructed to impart swirl to the fuel mixture during at least the initial portion of the intake period as determined by the combustion knock tendency and detonation characteristics of the engine.

12. In an internal combustion engine including a cylinder having intake port means, a piston reciprocating within the cylinder, and sleeve valve means associated therewith, said sleeve valve means having intake port means cooperating with said cylinder intake port means and having an opening edge inclined to a horizontal plane extending perpendicular to the sleeve and cylinder axes, said inclined edge having a horizontal component greater than the vertical component, whereby to provide swirling of the fuel mixture in said cylinder as determined by the combustion knock tendency and detonation characteristics of the engine.

13. In an internal combustion engine including a cylinder having intake port means, a piston reciprocating within the cylinder, and sleeve valve means associated therewith, said sleeve valve means having intake port means cooperating with said cylinder intake port means and having an opening edge inclined to a horizontal plane extending perpendicular to the sleeve and cylinder axes, said inclined edge being inclined at an angle of approximately twenty degrees with a horizontal plane of the engine extending perpendicular to the sleeve and cylinder axes, whereby to provide swirling of the fuel mixture in said cylinder as determined by the combustion knock tendency and detonation characteristics of the engine.

14. In an internal combustion engine of the sleeve valve type, a cylinder, sleeve valve means associated therewith and provided with sleeve port means, and means introducing a fuel mixture for combustion in the cylinder through said sleeve port means, said sleeve port means being constructed to impart directional movement to said fuel mixture as determined by the combustion knock tendency and detonation characteristics of the engine.

15. Sleeve valve means for an internal combustion sleeve valve engine having a cylinder, said sleeve valve means having sleeve port means through which a fuel mixture may be introduced in the cylinder for combustion, said sleeve port means having an opening edge inclined at an angle to a horizontal plane extending perpendicular to the sleeve axis for imparting a directional movement to said fuel mixture as determined by the combustion knock tendency and detonation characteristics of the engine.

16. Sleeve valve means for an internal combustion engine of the sleeve valve type having a cylinder, said sleeve valve means having sleeve port means through which a fuel mixture may be introduced in the cylinder for combustion, said sleeve port means having opening and closing edges and constructed to provide a port height substantially one-half of the port width, the opening edge being inclined at an angle to the opening edge of approximately twenty degrees, said opening edge located in a plane extending substantially perpendicular to the sleeve axis, said sleeve port means thereby constructed to impart a directional movement to said fuel mixture as determined by the combustion knock tendency and detonation characteristics of the engine.

17. In an internal combustion engine including a cylinder having an intake port, a piston reciprocating within the cylinder, a sleeve valve coaxial with the cylinder and having a combined reciprocating and oscillating movement with respect to the sleeve and cylinder axes, said sleeve having an intake port cooperating with the cylinder intake port, said sleeve port means constructed and operated in a predetermined timed relation with respect to the cylinder port, whereby the port opening takes place at a time when the sleeve valve means is positioned at an angle more than ten degrees past bottom dead center of the sleeve travel, and whereby said port imparts directional movement to a fuel mixture introduced to the cylinder through said sleeve port as determined by the combustion knock tendency and detonation characteristics of the engine.

18. An internal combustion engine including a cylinder having an intake port in the side wall thereof, a piston operable within the cylinder, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said opening edges being inclined less than approximately 35° with a plane perpendicular to the cylinder and sleeve axes.

19. An internal combustion engine including a cylinder having an intake port in the side wall thereof, a piston operable within the cylinder, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said opening edges being inclined less than approximately 35° with a plane perpendicular to the cylinder and sleeve axes, and more than approximately 10°.

20. An internal combustion engine including a cylinder having an intake port in the side wall thereof, a piston operable within the cylinder, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said opening edges being inclined substantially 20° with a plane perpendicular to the cylinder and sleeve axes.

21. An internal combustion engine including a cylinder having an intake port in the side wall thereof, a piston operable within the cylinder, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said opening edges being inclined less than approximately 35° with a plane perpendicular to the cylinder and sleeve axes, said closing edges lying substantially parallel with said plane.

22. An internal combustion engine including a cylinder having an intake port in the side wall thereof, a piston operable within the cylinder, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said opening edges being inclined less than approximately 35° with a plane perpendicular to the cylinder and sleeve axes, the opening edges of ports having horizontal components greater than the vertical components thereof.

23. An internal combustion engine including a cylinder having an intake port in the side wall thereof, a piston operable within the cylinders, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said opening edges being inclined substantially 20° with a plane perpendicular to the cylinder and sleeve axes, the opening edges of ports having horizontal components greater than the vertical components thereof.

24. An internal combustion engine including a cylinder having an intake port in the side wall thereof, a piston operable within the cylinder, a single sleeve valve coaxial with the cylinder and adapted to move with combined axial reciprocation and oscillation to define a closed curve path, said sleeve valve having an intake port adapted to register with said cylinder intake port, said sleeve and cylinder ports having cooperating opening and closing edges constructed to provide tangential entry of gas into the cylinder whereby said gas is caused to swirl within said cylinder, said ports presenting gas passages having greater circumferential dimensions than axial.

25. In an engine of the sleeve valve type, a cylinder ported for intake, a single sleeve valve movable with combined oscillation and reciprocation and having an intake port cooperating with said cylinder intake port, said intake ports having opening edges inclined between approximately 10° and 35° with a plane transverse with the cylinder axis, said opening edges adapted to register when the sleeve valve has moved in excess of approximately 10° past its lower-most point of travel.

26. In an engine of the sleeve valve type, a cylinder ported for intake, a single sleeve valve movable with combined oscillation and reciprocation and having an intake port cooperating with said cylinder intake port, said intake ports having opening edges inclined substantially 20° with a plane transverse with the cylinder axis, said opening edges adapted to register when the sleeve valve has moved in excess of approximately 10° past its lower-most point of travel.

ANDRE J. MEYER.